Feb. 27, 1968   F. S. SILLARS   3,370,772
SOLDER APPLICATORS
Filed Dec. 13, 1965   3 Sheets-Sheet 2
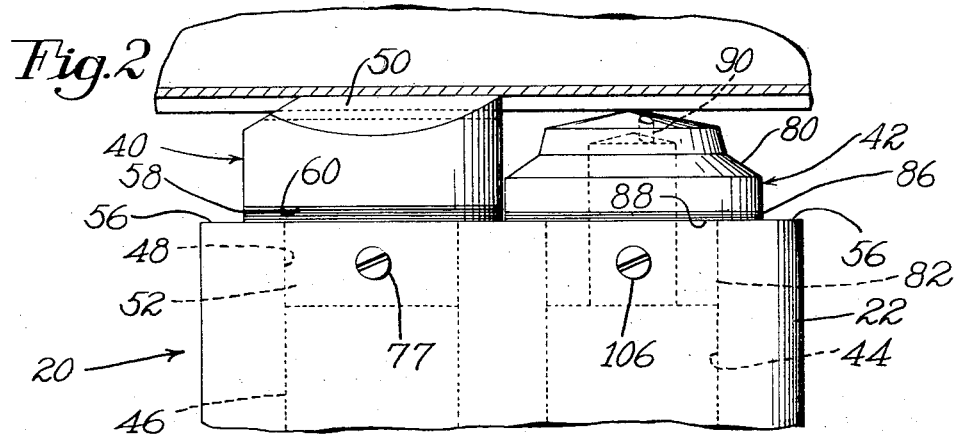
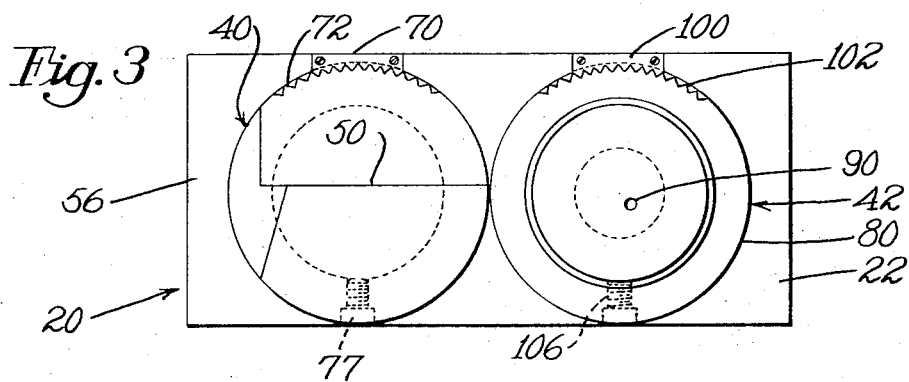
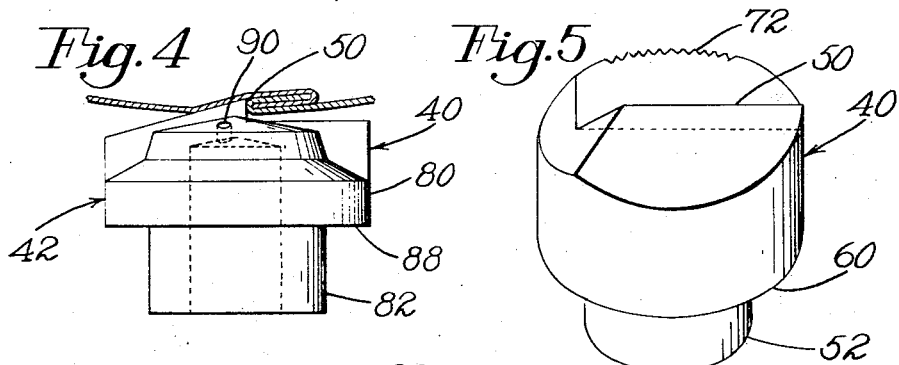
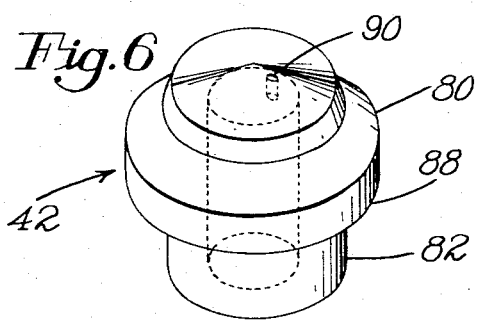

Feb. 27, 1968  F. S. SILLARS  3,370,772
SOLDER APPLICATORS
Filed Dec. 13, 1965  3 Sheets-Sheet 3
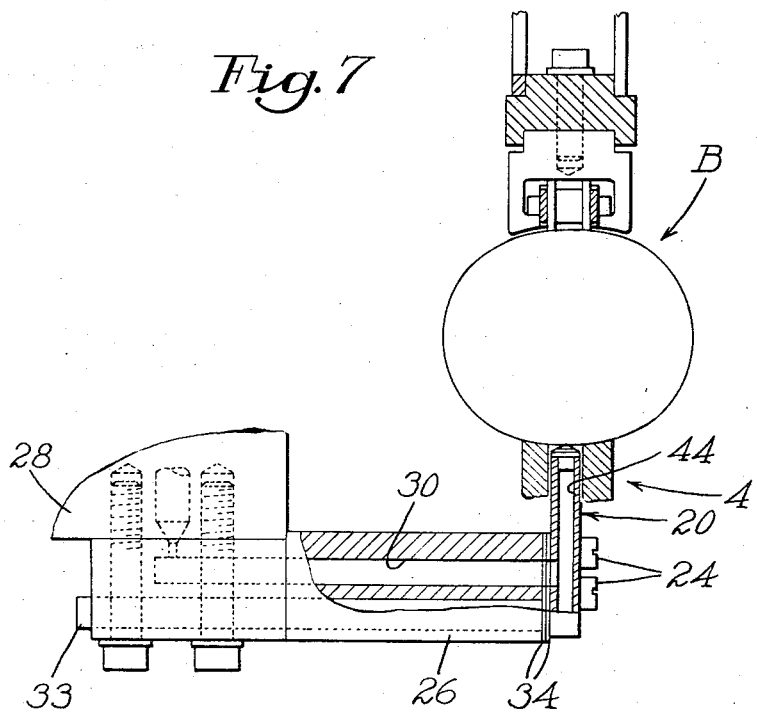

United States Patent Office 3,370,772
Patented Feb. 27, 1968

3,370,772
SOLDER APPLICATORS
Frederick S. Sillars, Beverly, Mass., assignor to United
Shoe Machinery Corporation, Flemington, N.J., and
Boston, Mass., a corporation of New Jersey
Filed Dec. 13, 1965, Ser. No. 513,260
6 Claims. (Cl. 228—43)

This invention relates to apparatus for soldering can bodies and, more particularly, to an improved applicator or nozzle for applying solder to the side seams of "tin" cans. The conventional method of forming a tin can is to bend a sheet of metal into a tube and interlock its edges to form a side seam of longitudinal seam joint of interlocked layers. It is to these layers that solder must be applied to seal the side seam. Apparatus including an applicator or nozzle for applying solder to a can formed in the manner just described is disclosed in applicant's United States Patent No. 3,190,528, issued June 22, 1965. The present invention relates to an improved applicator or nozzle for use with the apparatus disclosed in the referenced patent.

Solder applicators of the type disclosed in the referenced patent generally comprise a rigid, unitary member having a discharge orifice and seam guide means. Solder is fed to the discharge orifice through a plurality of passageways in the applicator. The seam guide means alines the side seams of can bodies to be soldered with the path of solder projected from the orifice whereby to ensure proper disposition of the solder as the can bodies are moved at high speed past the applicator.

The cost of manufacturing applicators of this type is high. The orifice must be precisely machined as well as the guide means. Further, the alinement of the orifice and guide means is critical. In the use of the applicator, the guide means engages the side seams of cam bodies passing thereover in order to move them into precise alinement with the solder being discharged. The guide means is thus subjected to frictional forces which cause relatively rapid wear particularly when the cans are being moved at a high rate of speed. Applicators of the type disclosed in the referenced patent must be totally discarded when their guide means are excessively worn as a result of their unitary character. Thus, applicators of this type are not not only costly but short-lived.

A further disadvantage flowing from the unitary character of the guide means and orifice member is that alteration of the trajectory and orientation of discharged solder cannot readily be achieved. Applicators of the type disclosed, as well as those taught by the remainder of the prior art, are designed to project solder in the direction of a side seam in a given angular and spacial orientation with respect thereto. Alteration of the trajectory and spacial relationship of the projected solder with respect to the side seams is essentially non-existent, i.e. unless a large number of complete applicators are available having different orifice orientation and guide means location. Obviously, the cost of such would be prohibitive.

Accordingly, it is an object of this invention to provide a solder applicator having means which are adaptable to varying orientations and spacings relative to the side seams of can bodies to be exposed thereto.

A further and correlative object is to provide an applicator having a discharge orifice and seam guide means the interspacial relationship of which may be conveniently varied.

A still further object is to provide an applicator having a selectively removable and replaceable discharge orifice and guide means.

To these ends and in accordance with a feature of this invention there is provided in a machine for applying solder to the side seams of moving can bodies each of which has a seam joint including a re-entrant groove, the combination of means for guiding can bodies for yielding movement along a predetermined path and an applicator. The applicator comprises a base member, a guide member adjustably and removably mounted on said base member, and an orifice member adjustably and removably mounted on said base member. Means are provided for fixedly locating the guide member in a desired orientation relative to the path of movement of can bodies established by the guide means and for locating the guide member in a desired spaced relationship with respect to path of movement of said can bodies. Means are also provided for fixedly locating the orifice member in a desired orientation relative to the alined path of movement of the side seams of the can bodies and for locating the orifice member in a desired spaced relationship to the path of movement of the side seams of the can bodies.

The above and other features of the invention including various novel details of construction and combinations of parts will now be more particularly described with reference to the accompanying drawings and pointed out in the claims. It will be understood that the particular embodiments of the invention are shown by way of illustration only and not as limitations of the invention. The principles and features of the invention may be employed in varied and numerous embodiments without departing from the scope of the invention.

In the drawings:

FIG. 2 is a side elevation in an enlarged scale of a solder applicator of the illustrative machine;

FIG. 3 is a plan view of the solder applicator illustrated in FIG. 2;

FIG. 4 is an end view of the applicator illustrated in FIG. 2;

FIG. 5 is a perspective view of the guide member of the subject invention;

FIG. 6 is a perspective view of the orifice member of the subject invention; and FIG. 7 is a sectional view in an enlarged scale taken along the line VII—VII of FIG. 1.

Figure 1:
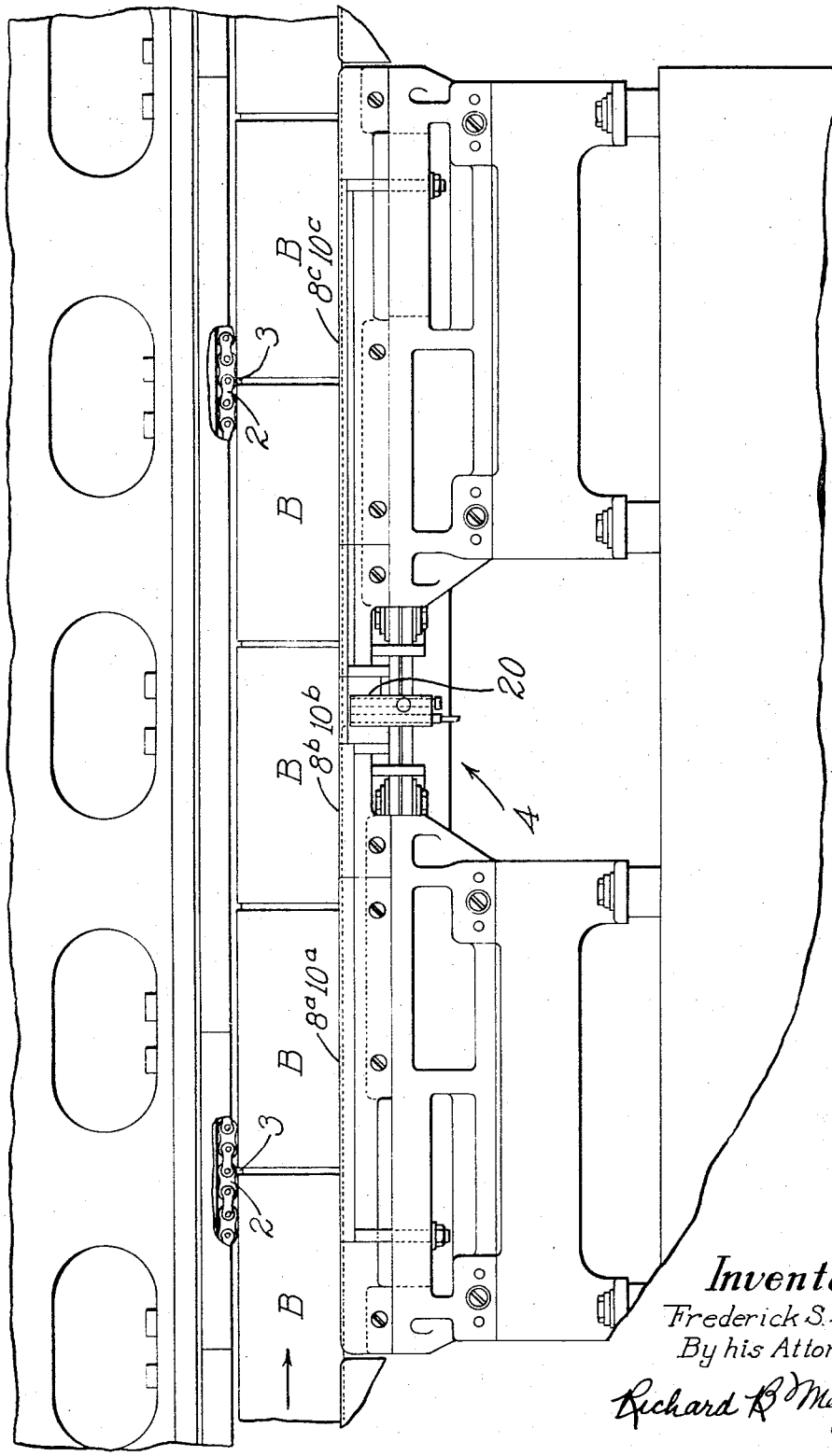
FIG. 1 is a side elevation of a can body soldering machine embodying the invention.

FIG. 1 shows can bodies B which were formed in a bodymaker of any conventional type, not illustrated, being conveyed from left to right in a timed and spaced order by a machine having an endless chain 2 with feed dogs 3 located at predetermined spaced intervals. Each dog 3 is engageable with the trailing end of one can body, the spaces between adjacent can bodies being equal to the length of the dogs. The bodies are conveyed past a soldering station 4 which constitutes the locus of this invention. The bodies are supported on spaced, parallel guide rails extending horizontally lengthwise of the machine including metallic portions 8a, 10a, 8c and 10c on either side of the soldering station 4 and ceramic portions 8b and 10b at the station.

The soldering station 4 includes a three part applicator 20 (FIGS. 2 to 5) having a base portion 22 which is secured by screws 24 to an arm 26 (FIG. 7) extending from the bottom of a solder reservoir 28 in a manner identical to that disclosed in the above referenced patent. The reservoir 28 includes adjusting means, not shown, for controlling the height of molten solder and means for continuously feeding bars of solder to the reservoir whereby the pressure of the molten solder at the applicator 20 is maintained at a uniform level. Solder flows from the reservoir through the arm 26 in a horizontal passageway 30 which is maintained at a constant predetermined temperature by a resistance heater 33. As in the referenced patent, horizontal adjustment of the applicator 20 is obtained by the use of shims 34 between the applicator 20 and the mounting arm 26.

The solder applicator essentially comprises the rigid base member 22, a guide member 40 and an orifice member 42. The base member 22 has a passageway 44 therein which, as seen in FIG. 7, communicates with the passageway 30 in the arm 26. The orifice member 42 is supported in the passageway 44 as hereinafter described. In the preferred embodiment illustrated in FIG. 2, the base member 22 has a second passageway 46 in which a resistance heater may be mounted to maintain solder flowing through the passageway 44 at a prescribed temperature level. The base 22 is also provided with a circular recessed portion 48 in the upper surface thereof to support and locate the guide member 40 as hereinafter described.

The guide member 40 comprises an upper guiding portion 50 and a depending mounting portion 52 complementary in size to the recess 48. The guide member 40 is mounted on the base 22 by press fitting the mounting portion 52 (FIG. 5) into the recess 48. The relative position of the guide member 40 with respect to an upper surface 56 of the base may be altered by the selective use of one or more annular spacers 58 (FIG. 2). The spacers 58 have a central aperture corresponding in diameter to the mounting portion 52 and, thus, the spacers 58 may be mounted on the depending portion 52. The lower surface 60 of the guide member normally engages the upper surface 56 of the base when no spacers 58 have been mounted on the depending portion 52. Thus, the relative position of the guide member 40 with respect to the base 22 and, therefore, with respect to the path followed by the side seams of can bodies guided along the rails 8, 10 may be adjusted conveniently by the use of spacers 58.

The guiding portion 50 of the guide member 40, in the preferred embodiment illustrated, comprises an upstanding inverted substantially V-shaped seam guide shaped to enter the re-entrant grooves in can bodies passing thereover to aline the path of movement of the side seams in accordance with the requirements dictated by the path of solder projection. A more detailed discussion is included in the above referenced patent. The seam guides need not continuously contact the sides of the re-entrant grooves in all applications. That is, for certain solder trajectories, as hereinafter to be described, the seam alinement is not as critical as for the trajectory in the application discussed in the referenced patent. Accordingly, in such applications, the V-shaped seam guide may be slightly displaced from the path of side seam movement whereby to urge unalined side seams generally into the prescribed path. The displaced seam guide would not, however, engage the sides of a re-entrant groove of a can body within the prescribed path. On the contrary, where, as in the referenced patent, the trajectory of the solder requires precise alinement of the side seams, the V-shaped seam guide is positioned to contact the sides of the re-entrant grooves to ensure exact alinement. Various solder trajectories will be discussed hereinafter in relation to the orifice member. The seam guide may be positioned to contact the re-entrant groove or in a displaced position by the judicious use of spacers 58 in the manner discussed above. It should be noted for consideration in the later discussion relative to the spacial requirements dictated by a particular solder trajectory that, when the seam guide is positioned continuously to contact the sides of the re-entrant groove, uniformity in the spacial relationship between the path of side seam movement and the base 22 and orifice member 42 is ensured.

The seam guide is continuously contacted by the side seams of can bodies when it is in an upper, contacting position and recurrently when it is in a displaced position described above. This contact unavoidably causes wear and disfiguration of the seam guide. The entire applicator described in the referenced patent had to be discarded when such wear or disfiguration became excessive. This problem or defect is remedied in the applicator of this invention by simply replacing the guide member 40. The base 22 and orifice member 42 are not subject to erosion of this type and, thus, need not be replaced as frequently.

The alinement of the guide member 40 with respect to the base 22 and the path of can body seam movement imposed by the guide rails 8, 10 is established by a plate 70 (FIG. 3) removably secured to the base member 22 and having a serrated edge portion which cooperates with a complementarily serrated arcuate section 72 on the guide member 40. That is, the seam guide 50 may be fixedly located in one of a plurality of positions by inserting the guide member 40 in the base with the serrated edge of the plate 70 meshed with a portion of the serrated section 72. The path of can body seam movement may thus be adjusted to establish a desired angular relation of the side seams with respect to the solder trajectory.

In an alternative embodiment, a set screw 77 may be utilized to replace both the spacers 58 and the serrated plate 70. The set screw 77 is shown in FIG. 2 to illustrate its equivalency to the spacers 58 and member 70 although it actually constitutes a superfluous structural element when used in combination with these members. When a set screw 77 is to be used in lieu of spacers 58 and the member 70, the guide member 40 is located in the appropriate vertical and rotative positions and the set screw 77 tightened.

The orifice member 42 comprises an upper orifice portion 80 and a depending mounting portion 82 complementary in size to the upper end of the passageway 44. The orifice member 42 is mounted on the base 22 by insertion of the mounting portion 82 into the upper end of the passageway 44. The relative position of the orifice member 42 with respect to the upper surface 56 of the base may be altered by the selective use of one or more annular spacers 86. The spacers 86 having a central aperture corresponding in diameter to the mounting portion 82 to permit mounting thereon for use in a manner similar to the spacers 58 associated with the guide member 40. The lower surface 88 of the orifice portion 80 engages the upper surface 56 of the base when no spacers are mounted on the depending portion 82. Thus, the relative position of the orifice member 42 with respect to the base 22 and, therefore, with respect to the guide member 40 and consequently the path followed by side seams of can bodies passing over the guide member 40 may be adjusted conveniently by the selective use of spacers 86.

In the embodiment particularly illustrated in FIGS. 2 and 3, the orifice member 42 has a substantially vertical discharge passageway 90 which communicates with the passageway 44. However, orifice members having a discharge passageway oriented in another direction may be employed in a similar fashion. Solder flowing from the discharge passageway 90 shown in FIGS. 2 and 3 is projected directly upwardly into a side seam located thereabove. The criticality in seam alinement and spacing with respect to the discharge passageway described in the referenced patent is therefore not present. That is, in the referenced patent the discharge passageway is so oriented that solder is discharged with a trajectory the apex of which coincides with the path of side seam movement of can bodies exposed thereto. Accordingly, the spacial relationship of the path of side seam movement with respect to the discharge passageway is critical. If a given can body is displaced below the prescribed path of movement, solder will be squirted through the gaps between can bodies and deposited on the inside thereof. In order to avoid such a situation when the orifice member 42 in FIGS. 2 and 3 is replaced by a low trajectory discharge member as described in the referenced patent, the guide portion of the guide member 40 is positioned to contact the re-entrant grooves of can bodies exposed thereto. The spacial alinement of the side seams of can bodies passing thereover is thus ensured since the guide member 40 will cam a can body displaced below the prescribed path into alinement.

A low trajectory discharge passageway is required, for example, when the inside of the can body is to be side striped. That is, passage of solder through the gaps between can bodies may be avoided when an essentially vertical or "high trajectory" discharge passageway is used by placing a shield member such as a roller at the location where the gaps between can bodies intersects the solder trajectory. However, where the inside of the can bodies is to be side striped by the application of a liquid material immediately prior to soldering, a shield cannot be utilized as it would wipe the striping off the can body if positioned properly. The trajectory employed and therefore the location of the guide member 40 is also influenced by the width of the distributed solder band that can be tolerated. Solder flowing from a vertical discharge passageway will tend to spread and therefore will apply a wider solder band than a low trajectory discharge passageway which is not as subject to this spreading phenomena. Seam alinement in the direction of can body movement is thus more critical for a low trajectory discharge passageway.

Ergo, when a low trajectory discharge passageway is to be used, the seam guide is positioned to contact the sides of the re-entrant groove of a can body exposed thereto whereby to assure the spacial alinement of the can body seams. When a vertical or high trajectory discharge passageway is to be used, the seam guide is located in a displaced position whereby to urge errant side seams into general alinement but not continuously to contact the sides of the re-entrant grooves. The exact inclination of the discharge passageway can be varied between the low trajectory and high trajectory positions described above. In certain applications where solder disposition need not be controlled with the preciseness discussed above, the guide member 40 actually may be eliminated if adequate external guide means such as described in my application for United States Letters Patent Ser. No. 323,387, filed Nov. 13, 1963, notice of allowance mailed Oct. 21, 1965, now Patent No. 3,255,856.

In the embodiment illustrated in FIGS. 2 and 3, the discharge passageway 90 is located on a radius of the generally circular orifice portion displaced from the center. Accordingly, the relative position of the discharge passageway 90 with respect to the path of side seam movement can be altered by rotation of the orifice member 42. Thus, the discharge passageway located may be adjusted to provide a desired angular relation with respect to the guide portion 50 of the guide member and, therefore, with respect to the path of side seam movement. To this end the base 22 is provided with a plate 100 having a serrated edge portion which cooperates with a complementarily serrated arcuate section 102 on the orifice member 42. The structure is similar to that provided for the guide member 40 as previously discussed. This feature is of particular value with respect to the use of a low trajectory orifice.

Again, as with the guide member 40, the spacers 86 and serrated member 100 may be replaced by a set screw 106.

In the use of an applicator of the type discussed above, solder is introduced into the solder pot in conventional manner. The solder flows through the passageways 30 and 44 and is discharged into the side seams of can bodies through the discharge passageway 90. The relative positions of the guide member 40 and orifice member 42 are initially adjusted in the manner described above in accordance with the particular application.

Having thus described my invention, what I claim as new and desire to secure by Letters Patent of the United States is:

1. In a machine for applying solder to the side seams of moving can bodies, the combination of means for guiding can bodies for movement along a predetermined path of travel and an applicator comprising a base member having a first passageway, a discrete guide member mounted on said base member to aline the movement of the side seams of said can bodies, a discrete orifice member mounted on said base member having a discharge passageway which communicates with the first passageway, and means permitting the independent selective positioning of said guide member and said orifice member with respect to the path of travel of said can bodies.

2. In a machine for applying solder to the side seams of moving can bodies, the combination of means for guiding can bodies for movement along a predetermined path of travel and an applicator comprising a base member having a first passageway, an orifice member mounted on said base member having a substantially vertical discharge passageway communicating with said first passageway, and means permitting the selective positioning of said orifice member with respect to the path of travel of said can bodies.

3. A machine for applying solder to the side seams of moving can bodies comprising the combination of means for guiding can bodies for movement along a predetermined path and an applicator comprising a base member having a first passageway, a guide member removably mounted on the base member, an orifice member removably mounted on said base member having a discharge passageway which communicates with the first passageway, and means for varying the spacial relationship of the guide member with respect to the predetermined path of movement of the can bodies.

4. A machine according to claim 3 and having means for varying the spacial relationship of the orifice member with respect to the guide member.

5. A machine according to claim 3 and having means for varying the orientation of the guide member relative to the predetermined path of movement of the can bodies.

6. A machine according to claim 3 and having means for varying the orientation of the orifice member thereby to adjust the orientation of the discharge passageway with respect to the guide member.

No references cited.

RICHARD H. EANES, JR., *Primary Examiner.*